Aug. 18, 1931.    H. B. HASS    1,819,166
METHOD AND APPARATUS FOR PRODUCING ACTIVATED CHARCOAL
Filed Sept. 17, 1928

Inventor
Henry Bohn Hass,

By George A. Prevost
Attorney

Patented Aug. 18, 1931

1,819,166

UNITED STATES PATENT OFFICE

HENRY BOHN HASS, OF CHARLESTON, WEST VIRGINIA, ASSIGNOR TO GASOLINE RECOVERY CORPORATION, OF CHARLESTON, WEST VIRGINIA, A CORPORATION OF DELAWARE

METHOD AND APPARATUS FOR PRODUCING ACTIVATED CHARCOAL

Application filed September 17, 1928. Serial No. 306,594.

This invention relates to improvements in the "activation" of charcoal and apparatus for producing it. The activation of various kinds of charcoal by partial oxidation for the purpose of increasing their adsorptive capacity has been known and practiced for a long time. The activation is carried out in substantially the same way as preparing charcoal either for adsorption from liquid solutions (decolorization) or for adsorption of vapors or gases from other vapors or gases. The main difference between the charcoals prepared for decolorizing and those prepared for gas adsorption consists in the fact that light porous charcoal is usually used for decolorizing while dense charcoal is used for gas adsorption. This is primarily due to the greater rate of diffusion of gases as compared to substances in solution in liquids, the gas molecules being able to reach the internal surfaces of a dense charcoal which are not accessible to the molecules or colloidal particles which must be adsorbed when, e. g., a sugar solution is decolorized.

The partial oxidation may be accomplished either by exothermic or endothermic reactions. Air at temperatures between 350° and 450° C. is the oxidizing agent generally used for exothermic oxidation although sulfuric acid, nitric acid or other oxidizing agents may also be used. Superheated steam either alone or diluted with flue gases is commonly used for endothermic activation, although carbon dioxide also gives good results.

It has been known for a long time that endothermic oxidation at high temperatures, 700°–1100° C. gives results which are better than those obtained by the low temperature exothermic activations, but the high temperatures required, combined with the necessity of supplying large quantities of heat so as to maintain a high uniform temperature in a granular mass of charcoal which possesses heat insulating properties, has made the endothermic activation process both difficult and expensive. High priced heat resisting alloys have been used quite widely and in large quantities, and are necessary if one uses some of the methods for activating charcoal by endothermic oxidation. The cost of the fuel required to operate most of the known processes of endothermic charcoal oxidation is considerable.

By my invention, I am enabled to combine the simplicity and relative cheapness of apparatus and absence of fuel cost of the exothermic oxidation processes with the excellent yields and high activity resulting from endothermic oxidation. My process is based upon the fact that the heat consumed during the endothermic oxidation of charcoal either by steam or by carbon dioxide is much less than that which is liberated by the combustion of the gases formed by the activation.

The reactions involved are as follows:

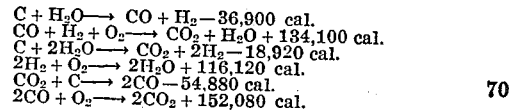

If a quantity of air is supplied to charcoal which is at a temperature between 700–1100° C. and the mass of charcoal is considerably in excess of the amount which the given quantity of air can oxidize, the gas resulting will consist essentially of a mixture of nitrogen, carbon dioxide and carbon monoxide. If a further supply of air is permitted to contact with these gases, the oxygen of the incoming air will react with the carbon monoxide of the said gases, converting it to carbon dioxide. Since, as above shown, more heat is liberated by the combustion of the carbon monoxide than is absorbed in its formation, no heat need be supplied from an exterior source, and no outside fuel is necessary after the reaction is once started. The carbon dioxide formed by the action of oxygen of the air upon the carbon monoxide formed during the activation is in turn permitted to contact again with the charcoal, thus continuing the endothermic oxidation. A portion of the gases formed by the activation or a portion of the gases formed by the combustion of said gases is withdrawn from the system to provide room for the incoming air. In this way no free oxygen is allowed to reach the charcoal which is being subjected to endothermic oxidation and at the same time no external heat need be supplied since the net result of the reactions taking place is the oxidation of the charcoal to carbon monoxide and dioxide indirectly by the oxygen of the air.

If steam is mixed with the air it will oxidize the charcoal forming hydrogen and a mixture of carbon monoxide and carbon dioxide. The ratio of carbon dioxide to carbon monoxide formed under these conditions depends upon the temperature, increasing temperature favoring the formation of carbon monoxide. The mixture of unreacted steam, hydrogen, carbon monoxide and carbon dioxide is combustible and reacts with the oxygen of the incoming air which oxidizes the hydrogen to steam and the carbon monoxide to carbon dioxide which will in turn attack the carbon. Since steam oxidizes charcoal at a somewhat lower temperature than carbon dioxide does, it is possible to carry on the oxidation almost exclusively by means of steam by proper temperature regulation even though carbon dioxide is present in the gases contacting with the charcoal.

The process described above may be carried out in a great many different types of apparatus with good results providing the following conditions are fulfilled: (1) The charcoal is contacted with gases capable of oxidizing it endothermically and thus forming combustible gases: (2) The combustible gases formed by the activation reactions are mixed with enough air to oxidize some of the reducing gases but in such proportion that practically no free oxygen remains after the combustion: (3) The gases resulting from said combustion are again contacted with the charcoal and the process is repeated indefinitely.

The temperature may be controlled by changing the rate of admission of air. As more air is admitted, the reaction becomes more rapid and the temperature increases. A balance must be struck between the heat evolution on the one hand, and the losses by radiation, etc., on the other hand. An alternative method is to admit steam to keep the temperature down.

An apparatus which is suitable for carrying out this process is illustrated in the accompanying drawings.

Referring to the drawings.

Figure 1:
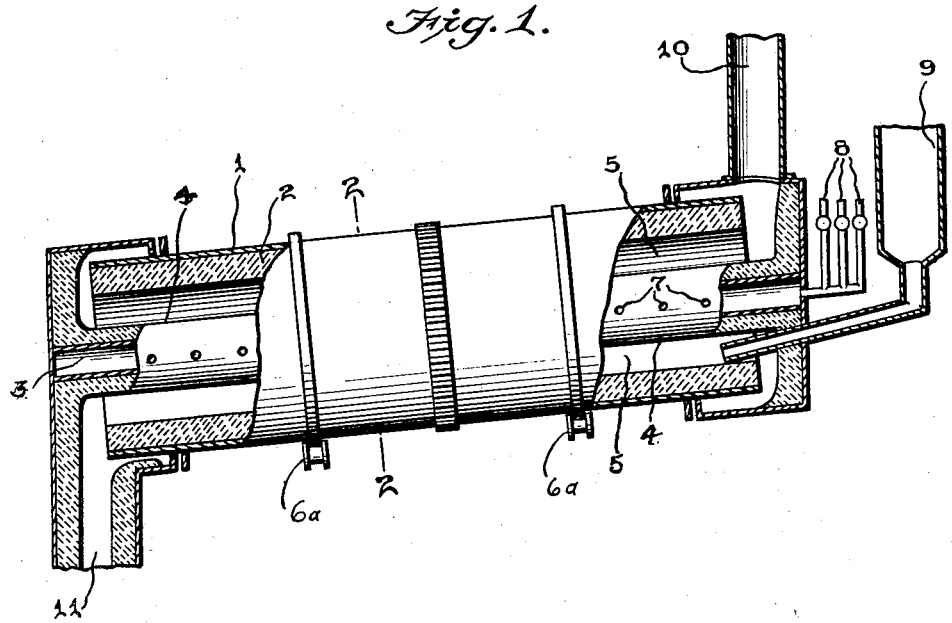
Fig. 1 is a side view of the apparatus with parts in vertical section to illustrate the interior.

In the drawings, 1 is an outer cylindrical casing lined with insulating refractory material 2. 3 is an inner cylindrical casing covered with insulating refractory material. These two cylindrical casings form an insulated chamber 5, where the charcoal 6 may undergo treatment. The outer cylindrical casing is mounted on rollers 6a, so that it may be rotated slowly and thereby agitate the charcoal. It may be slightly inclined so that the charcoal will slowly travel from one end to the other. 7 refers to air inlets which are substantially tangential to the tube 3 and through oxygen to support the endothermic reactions is supplied. 8 refers to inlets where air and steam or other temperature controlling vapors or gases may be admitted. 9 is a hopper for supplying raw charcoal. 10 is a flue where excess gases are taken off, and 11 is a vent through which the finished product is withdrawn.

Figure 2:
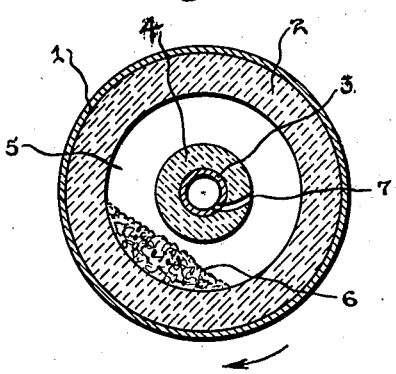
Fig. 2 is a vertical sectional view on line 2—2 of Fig. 1.

In operation, the raw material is slowly fed through hopper 9 into the chamber 5, where the temperature is kept between substantially 700° and 1100° C. Air admitted through vents 7 oxidizes the CO to $CO_2$ and induces a current counter clockwise (Fig. 2), around the reaction chamber where it first comes in contact with the charcoal being partially reduced again to CO. Steam or other gases or vapors may be used for regulating the temperature within the reaction chamber. They are admitted to the inside of the smaller cylindrical casing, the same as the air, through valves 8. They are then distributed throughout the reaction chamber through vents 7. The slow rotation of the outer casing 1 keeps the charcoal stirred and helps distribute the heat.

It is understood that I do not limit myself to the details of this particular apparatus, as it is merely illustrative of the general process.

What I claim and desire to secure by Letters Patent is:

1. A process for activating charcoal by endothermic oxidation, which consists in activating the charcoal, oxidizing the gases produced during the activation by oxygen from the air, then causing said gases to be contacted again with the charcoal undergoing oxidation-activation, adding steam to said gases while the oxidation-activation is taking place, and utilizing the heat from the combustion of the said gases meanwhile to supply the heat required for maintaining the endothermic oxidation of the charcoal.

2. In the activating of charcoal, the steps which consist in activating the charcoal by carbon dioxide to which steam has been added, and oxidizing the gases produced during the activation with oxygen from the air to prepare them for further contact with the charcoal.

3. In the process of activating charcoal by endothermic oxidation, including the use of activating gases, the step which consists in controlling the temperature of the activating gases by the addition of steam in quantities as required.

4. An apparatus for activating charcoal, comprising a rotatable tubular retort inclined to the horizontal and insulated to prevent radiation of heat, a stationary conduit extending lengthwise within the retort, and provided with outlet means for feeding a gaseous medium into the retort, means for introducing gaseous fluid into the conduit in regulated quantity, means for feeding charcoal into the upper end of the retort, means for discharging the charcoal from the lower end of the retort, and means for discharging gases from the retort.

5. An apparatus for activating charcoal, comprising a rotatable tubular retort inclined to the horizontal, a conduit extending lengthwise within the retort and provided with outlet means for feeding a regulated amount of gaseous medium into the retort in a direction approximately tangential to said conduit, means for feeding charcoal into the upper end of the retort, and means for discharging gases from the retort.

6. An apparatus for activating charcoal, comprising a rotatable tubular retort inclined to the horizontal and insulated to diminish radiation of heat, a stationary conduit extending lengthwise within the retort and provided at spaced points along its length with outlet means for feeding a gaseous medium into the retort tangentially relatively to said conduit, means for introducing gaseous fluid into the conduit in regulated quantity, means for feeding charcoal into the retort, means for discharging charcoal from the retort, and means for discharging gases from the retort.

In testimony whereof I affix my signature.
HENRY BOHN HASS.